US010572500B2

(12) United States Patent
Schonfeld et al.

(10) Patent No.: US 10,572,500 B2
(45) Date of Patent: Feb. 25, 2020

(54) FEEDING NETWORKS OF MESSAGE BROKERS WITH COMPOUND DATA ELABORATED BY DYNAMIC SOURCES

(71) Applicant: Verisign, Inc., Reston, VA (US)

(72) Inventors: Daniel Schonfeld, Reston, VA (US); Paolo Maresca, Fribourg (CH)

(73) Assignee: VERISIGN, INC., Reston, VA (US)

( * ) Notice: Subject to any disclaimer, the term of this patent is extended or adjusted under 35 U.S.C. 154(b) by 549 days.

(21) Appl. No.: 15/052,761

(22) Filed: Feb. 24, 2016

(65) Prior Publication Data
US 2017/0244799 A1    Aug. 24, 2017

(51) Int. Cl.
| | |
|---|---|
| H04L 12/58 | (2006.01) |
| G06N 99/00 | (2019.01) |
| G06N 5/04 | (2006.01) |
| G06Q 10/10 | (2012.01) |
| G06F 17/27 | (2006.01) |
| G06F 16/25 | (2019.01) |

(52) U.S. Cl.
CPC ................................. *G06F 16/258* (2019.01)

(58) Field of Classification Search
CPC .... H04L 67/26; H04L 67/10; G06F 17/30569
See application file for complete search history.

(56) References Cited

U.S. PATENT DOCUMENTS

| | | | | |
|---|---|---|---|---|
| 8,887,214 B1* | 11/2014 | Black | ................. | H04N 21/4227 |
| | | | | 725/105 |
| 2006/0265508 A1* | 11/2006 | Angel | ............... | H04L 29/12047 |
| | | | | 709/230 |
| 2007/0016690 A1* | 1/2007 | Fishman | .............. | G06Q 10/107 |
| | | | | 709/244 |
| 2010/0223105 A1* | 9/2010 | Gassewitz | .............. | G06Q 30/02 |
| | | | | 705/7.29 |
| 2010/0274864 A1* | 10/2010 | Jalili | ................. | G06F 17/30887 |
| | | | | 709/206 |
| 2011/0004897 A1* | 1/2011 | Alexander | ......... | H04N 7/17336 |
| | | | | 725/32 |
| 2011/0296391 A1* | 12/2011 | Gass | ......................... | G06F 8/36 |
| | | | | 717/168 |
| 2012/0166459 A1* | 6/2012 | Ritter | ................ | G06F 17/30569 |
| | | | | 707/756 |

(Continued)

*Primary Examiner* — Abdullahi E Salad
(74) *Attorney, Agent, or Firm* — Artegis Law Group, LLP (57) ABSTRACT

Various embodiments of the invention disclosed herein provide techniques for transforming and distributing data in a distributed computing system. New data types are created on-demand by deriving, transforming, and aggregating data from already existing data sources. A data transformation engine identifies a first subscription request received from a first subscriber for a first resource included in a plurality of resources. The data transformation engine determines that the first resource is not available from any publisher included in a plurality of publishers. The data transformation engine generates a transformation rule that transforms a set of second resources available from a set of first publishers included in the plurality of publishers into the first resource. The data transformation engine transforms the set of second resources into the first resource based on the inferred transformation rule. The data transformation engine publishes the first resource to the first subscriber.

19 Claims, 8 Drawing Sheets

(56) References Cited

U.S. PATENT DOCUMENTS

| | | | | |
|---|---|---|---|---|
| 2012/0179840 A1* | 7/2012 | Belanger | ............... | H04L 67/02 709/246 |
| 2012/0260159 A1* | 10/2012 | Lazier | ............... | G06F 3/1415 715/234 |
| 2013/0124698 A1* | 5/2013 | Saxena | ............... | H04L 29/06 709/219 |
| 2014/0032561 A1* | 1/2014 | Dahl | ............... | G06F 17/30899 707/740 |
| 2014/0164351 A1* | 6/2014 | Grant | ............... | G06F 17/30864 707/710 |
| 2014/0358916 A1* | 12/2014 | Anand | ............... | G06F 17/30991 707/732 |
| 2015/0120870 A1* | 4/2015 | Schuman | ............... | H04L 67/06 709/217 |
| 2015/0222938 A1* | 8/2015 | Hasek | ............... | H04L 67/2823 725/92 |
| 2017/0070570 A1* | 3/2017 | Jalili | ............... | H04L 67/1097 |
| 2017/0147534 A1* | 5/2017 | Sethuraman | ............... | G06F 17/212 |
| 2017/0180289 A1* | 6/2017 | Chiappone | ............... | H04L 51/12 |

\* cited by examiner

FEEDING NETWORKS OF MESSAGE BROKERS WITH COMPOUND DATA ELABORATED BY DYNAMIC SOURCES

BACKGROUND OF THE INVENTION

Field of the Invention

The present invention relates generally to computer networks and data distribution and, more specifically, to feeding networks of message brokers with compound data elaborated by dynamic sources.

Description of the Related Art

In the domain of distributed computing, raw data is produced by various data sources and distributed to various client devices via wide area networks (WANs), such as the Internet. As the number of devices, appliances, and applications connected over networks continues to increase, a phenomenon sometimes referred to as the "Internet of Things" (IoT), the amount and types of raw data produced by various data sources within those networks also continues to increase dramatically. Consequently, a problem that oftentimes arises is that the data produced by the data sources is not directly consumable by the client devices. In such cases, the client devices first have to transform the raw data received from the data sources, via techniques such as data filtering, conversion, and derivation, into data that can be consumed by the client devices.

In one example, a data source could produce data in a particular data format that is not recognized by a particular client device, such as when a particular data source transmits messages using a protocol that the client device is unable to interpret. In such a situation, the client device would need to perform a protocol translation on the data from the data source before consuming the data. In another example, a data source could produce temperature data at a particular location once per second. However, a client device could request that the temperature data be delivered once per minute. In such a situation, the client device would need to sample, filter, or aggregate and average the temperature from the data source to yield once-per-minute temperature data. In another example, a data source could produce temperature data at a particular location in degrees Celsius. However, a client device could request that the temperature data be delivered in degrees Fahrenheit. In such a situation, the client device would need to convert the temperature from the data source to yield Fahrenheit temperature data rather than Celsius temperature data. In yet another example, a second data source could produce dew point data at the particular location once per second. A client device that requests relative humidity data would need to access to the temperature and dew point data from both data sources and then derive the relative humidity data the temperature and dew point data from the source data.

In each of these examples, a client application executing on the client device typically performs the necessary data transformation operations on the raw data received from the data source to generate data that can be consumed by the client device. In a typical flow, the client application receives the raw data, performs the needed transformation operations, and then stores the derived data as a new data set in local memory accessible by the client device. The client can then accesses the derived data contained in the new data set directly from the local memory on an as-needed basis.

One drawback of the above approach is that the data produced by a given data source is not transformed and made available to a client device immediately upon being produced by the data source. Another drawback is that the data derived from raw data received from a data source and stored in memory local to a particular client device is not readily accessible by other client devices that also need access to that same derived data. Among other things, these drawbacks can cause substantial latencies between the point in time when raw data from a data source is initially produced and the point in time when data derived from that raw data is actually available to a client device for consumption. Those latencies may result in client devices receiving stale data that is no longer current and/or relevant.

As the foregoing illustrates, what is needed in the art are more effective ways to transform and distribute data to client devices in a distributed computing environment.

SUMMARY OF THE INVENTION

Various embodiments of the present application set forth a computer-implemented method for transforming and distributing data in a distributed computing system. The method includes creating new data types on-demand by deriving, transforming, and aggregating data from already existing data sources. The method includes identifying a first subscription request received from a first subscriber for a first resource included in a plurality of resources. The method further includes determining that the first resource is not available from any publisher included in a plurality of publishers. The method further includes generating a first transformation rule that transforms a second resource available from a first publisher included in the plurality of publishers into the first resource. The method further includes transforming the second resource into the first resource based on the transformation rule. The method further includes publishing the first resource to the first subscriber.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that derived data is made available to client devices with reduced latency relative to prior approaches. As a result, data is consumed by client devices in real time or near real time as the raw data is produced by the data source. Another advantage of the disclosed techniques is that new data types are automatically and recursively created either from raw data sources, derived data, or a combination of raw data sources and derived data. As a result, requests for new forms of derived data can leverage existing derived data sources, reducing the calculations needed to create new derived data sources.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1A:
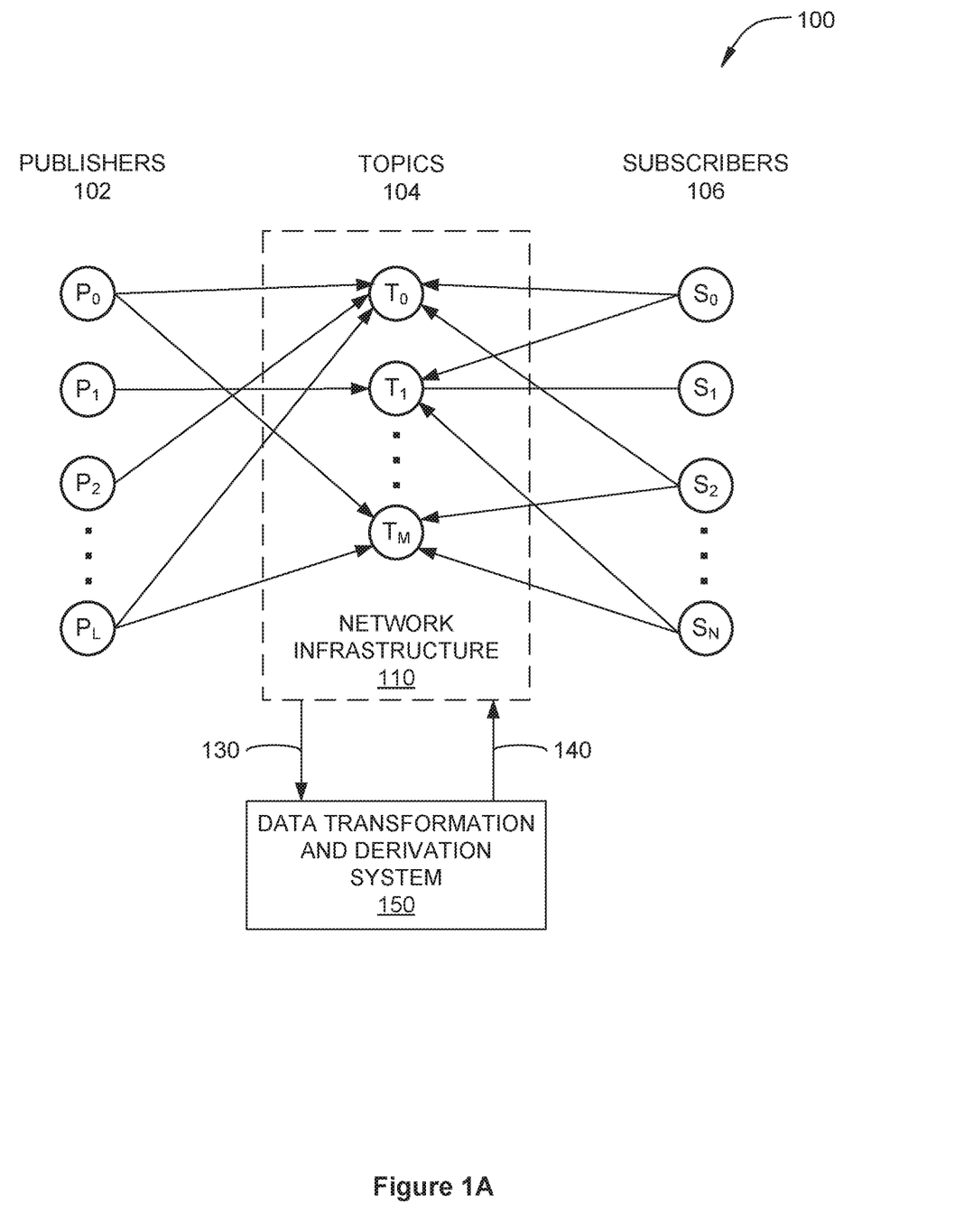
FIG. 1A illustrates a system configured to implement one or more aspects of the present invention.

FIG. 1A illustrates a system configured to implement one or more aspects of the present invention. As shown, publish-subscribe (pub/sub) network 100 includes publishers 102, topics 104, and subscribers 106. Publishers 102 include individual publishers $P_0$ through $P_L$, topics 104 include individual topics $T_0$ though $T_M$, and subscribers 106 include individual subscribers $S_0$ though $S_N$. Publishers 102 are configured to publish content that is associated with individual topics 104. For example, publisher $P_L$ could publish content that is associated with topics $T_0$ and $T_M$. Topics 104 include any data object that produces by a publisher 102 and/or consumed by a subscriber 106, including, without limitation, data related to a resource or metadata. As used herein, the terms "subject," "resource," "topic," and "metadata" all refer to data objects produced by a publisher 102 and/or consumed by a subscriber 106. Subscribers 106 are configured to subscribe to content that is associated with individual topics 104. For example, subscriber $S_N$ could subscribe to topics $T_1$ and $T_M$.

Network infrastructure 110 includes various computing and communication resources that are collectively configured to facilitate the publish-subscribe architecture described above. Network infrastructure 110 could include, for example, routers configured to move traffic through publish-subscribe network 100, server machines configured to process and respond to requests, databases that cache content at various edge locations, message queues configured to queue messages exchanged via network infrastructure 110, and so forth.

Data transformation and derivation system 150 is coupled to and/or integrated with network infrastructure 110 via communications channels 130 and 140. Data transformation and derivation system 150 is configured to receive data from publishers 102 and route the received data to one or more subscribers 106. Data transformation and derivation system 150 is further configured to transform existing data types into new derived data types based on data requested by one or more subscribers 106. Data transformation and derivation system 150 generates new derived data types from data received from publishers 102, data from previously derived data types in any combination. Data transformation and derivation system 150 maintains a database (not explicitly shown) of various data types produced by each publisher 102 and derived by the data transformation and derivation system 150 itself. In this manner, data transformation and derivation system 150 maintains and produces raw data types and derived data types based on data requested by subscribers 106. After transforming the received data, data transformation and derivation system 150 transmits the derived data to the requesting subscribers 106.

Figure 1B:
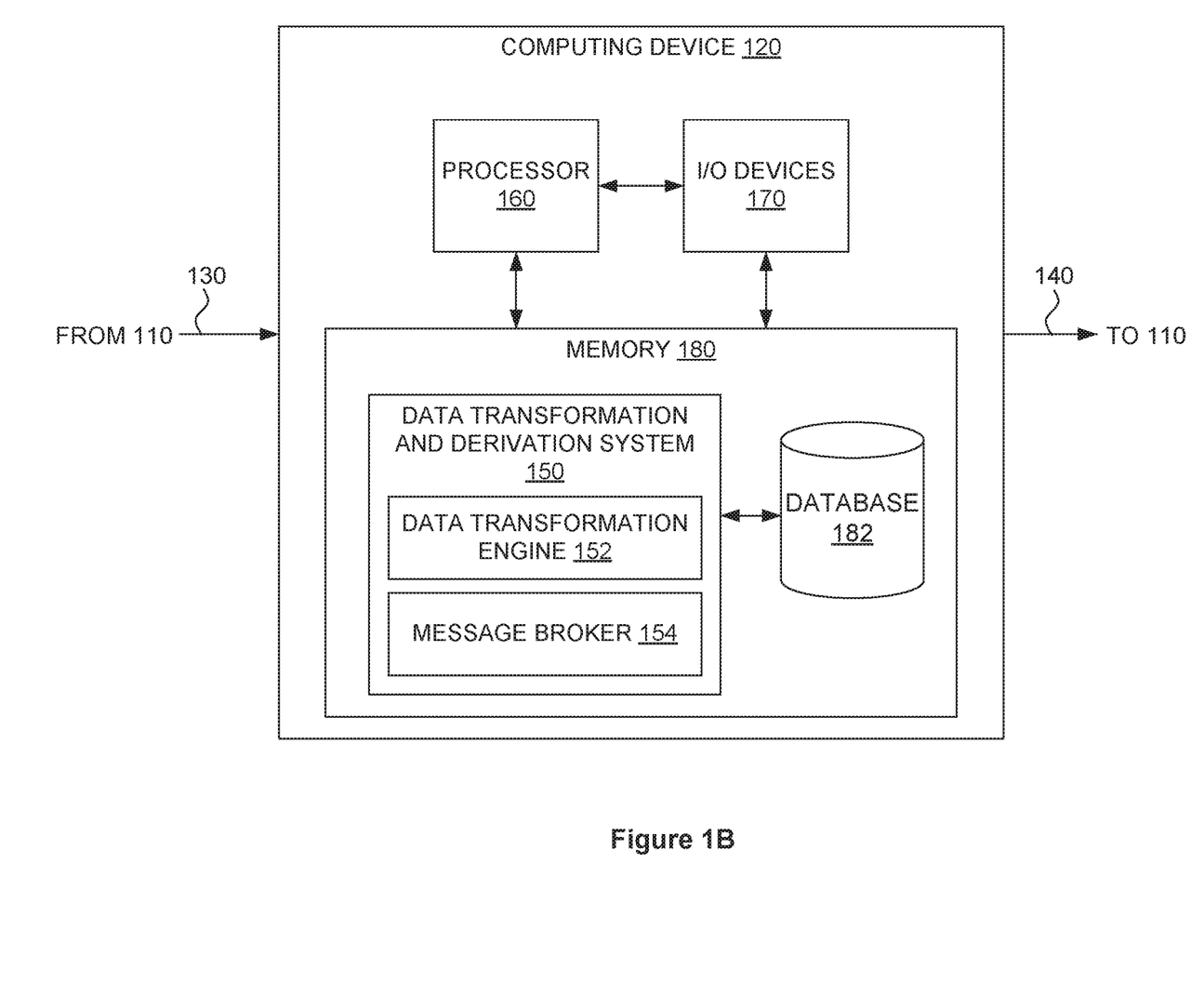
FIG. 1B illustrates an exemplary computing device configured to execute the data transformation and derivation system of FIG. 1A, according to various embodiments of the present invention.

FIG. 1B illustrates an exemplary computing device 120 configured to execute the data transformation and derivation system 150 of FIG. 1A, according to various embodiments of the present invention. As shown, computing device 120 includes processor 160, input/output (I/O) devices 170, and memory 180.

Processor 160 may be any technically feasible form of processing device configured process data and execute program code. Processor 160 could be, for example, a central processing unit (CPU), a graphics processing unit (GPU), an application-specific integrated circuit (ASIC), a field-programmable gate array (FPGA), and so forth. I/O devices 170 may include devices configured to receive input, including, for example, a keyboard, a mouse, and so forth. I/O devices 170 may also include devices configured to produce output, including, for example, a display device, a speaker, and so forth. I/O devices 170 may further include devices configured to both receive and produce input and output, respectively, including, for example, a touchscreen, a universal serial bus (USB) port, and so forth.

Memory 180 may be any technically feasible storage medium configured to store data and software applications. Memory 180 could be, for example, a hard disk, a random access memory (RAM) module, a read-only memory (ROM), and so forth. Memory 180 includes data transformation and derivation system 150 and database 182. In FIG. 1B, data transformation and derivation system 150 is implemented as a computer-readable medium, such as an executable application. When executed by processor 160, data transformation and derivation system 150 performs any and all of the transformation-related operations described herein. In doing so, data transformation and derivation system 150 may implement software versions of a data transformation engine 152 and a message broker 154, as described in further detail in conjunction with FIG. 2. Data associated with the data transformation engine 152 and the message broker 154 may be stored in database 182. Database 182 may also reside at another location that is accessible to data transformation and derivation system 150. Persons skilled in the art will recognize that the software implementation discussed in conjunction with FIG. 1B represents just one possible implementation of data transformation and derivation system 150, and that other implementations fall equally within the scope of the claimed embodiments. The data transformation and derivation system 150 is described in greater detail below in conjunction with FIG. 2.

Feeding Networks of Message Brokers with Compound Data

Figure 2:
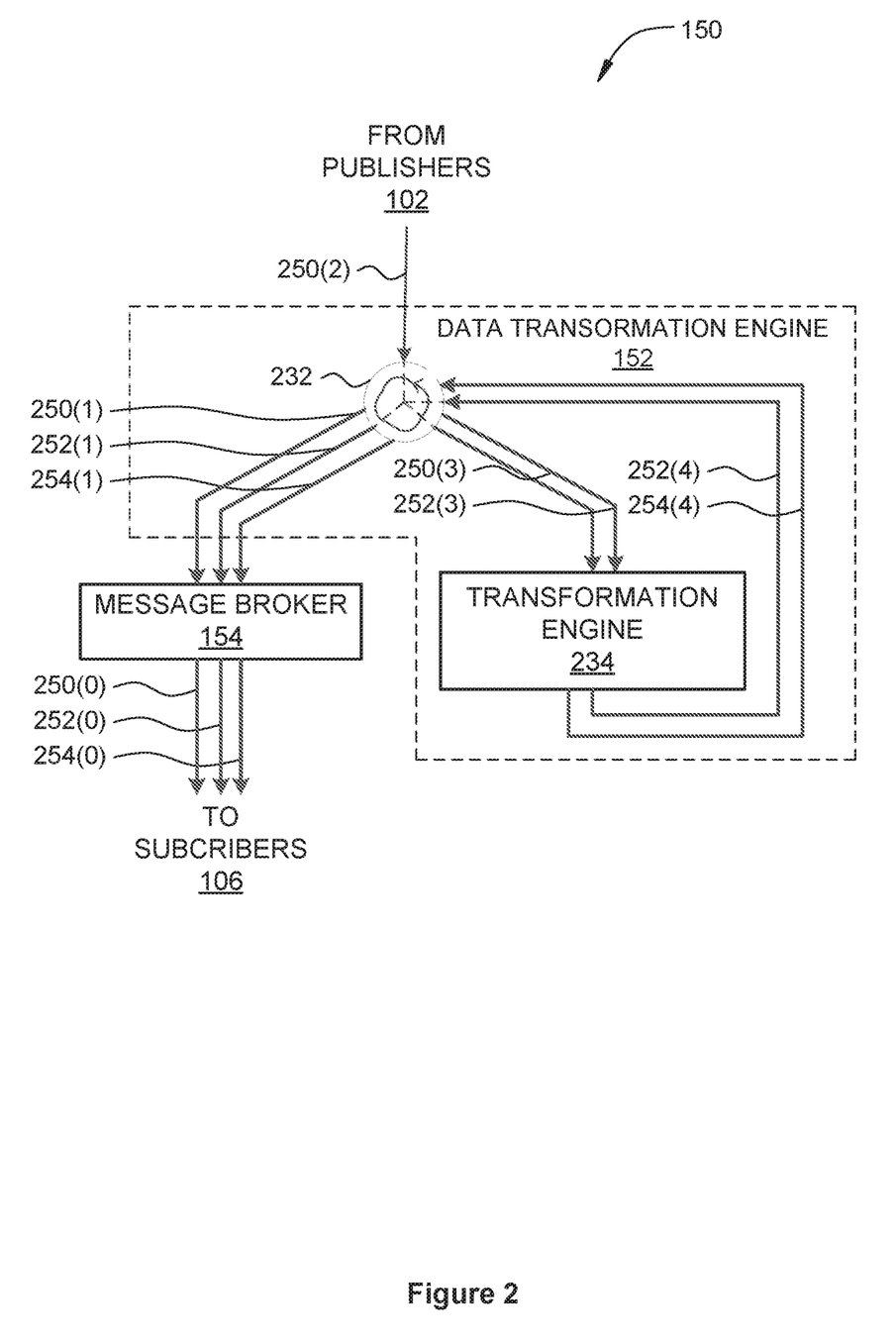
FIG. 2 illustrates a more detailed view of the data transformation and derivation system of FIGS. 1A-1B, according to various embodiments of the present invention.

FIG. 2 illustrates a more detailed view of the data transformation and derivation system 150 of FIGS. 1A-1B, according to various embodiments of the present invention. As shown, the data transformation and derivation system 150 includes, without limitation a data transformation engine 152 and a message broker 154. The computer system 100 of FIG. 1 can be configured to implement any one or more elements of the data transformation and derivation system 150 in any combination. For example, each of the publishers 102, subscribers 106, data transformation engine 152, and message broker 154 could be implemented on separate instances of computer system 100. Further, a single instance of computer system 100 could be configured to perform operations associated with multiple elements of the data transformation and derivation system 150. As one example, and without limitation, a single instance of computer system 100 could perform operations associated with both the data transformation engine 152 and the message broker 154.

Publishers 102 produce data from one or more data sources via messages that are transmitted to one or more networks, such as a LAN or a WAN. The data published by publishers is referred to herein as data types or, in the alternative, events. The data messages include data related to the data sources along with corresponding metadata that further categorizes and characterizes the data. In general, publishers 102 do not transmit data messages directly to specific subscribers 106. Rather, publishers 102 transmit data messages without knowledge or regard of which subscribers 106, if any, that request the data produced by a particular publisher 102.

Subscribers 106 consume data from one or more publishers 102. More specifically, subscribers express interest in particular data without regard to which publishers 102, if any, are configured to produce the requested data. That is, there is no specific connection between a specific subscriber 106 and a specific publisher 102 to produce data requested by the subscriber 106.

The data transformation engine 152 monitors messages transmitted by publishers 102. The data transformation engine 152 includes, without limitation, a filter engine 232 and a transformation engine 234. The data transformation engine 152 processes data from publishers 102 via the filter engine 232 and the transformation engine 234. The data transformation engine 152 then transmits data to one or more message brokers, such as message broker 154.

The filter engine 232 receives data from publishers 102 and routes the received data to the transformation engine 234 and the message broker 154 as appropriate. Further, the filter engine 232 receives derived data from the transformation engine 234 and routes the derived data to the transformation engine 234 and the message broker 154 as appropriate. The filter engine 232 maintains a database (not explicitly shown) of various data produced by each publisher 102 and by the transformation engine 234. In this manner, the filter engine 232 maintains and produces raw data and derived data based on data requested by subscribers 106.

The transformation engine 234 receives raw data and derived data from the filter engine 232. The transformation engine 234 transforms the received data into new derived data based on data requested by one or more subscribers 106. After transforming the received data, the transformation engine 234 transmits the derived data to the filter engine 232.

The message broker 154 receives raw data from publishers 102 via the data transformation engine 152. The message broker 154 also receives derived data from the data transformation engine 152, where the derived data is based on one or both of raw data from publishers 102 and previously derived data. The message broker 154 maintains a database (not explicitly shown) of the data requested by each subscriber 106. The message broker 154 compares the data received from the data transformation engine 152 against the data requested by each subscriber 106. Based on this comparison, the message broker 154 routes the appropriate data to the requesting subscribers 106. In combination, the data transformation engine 152 and the message broker 154 monitor data from publishers 102, transform data into various derived data types based on data requested by subscribers 106, and route data to the appropriate subscribers 106. As a result, publishers 102 and subscribers 106 are essentially decoupled and, in general, are not specifically aware of one another.

The data transformation engine 152 processes data in three phases: (1) filter phase (i.e. recognizing events/data type to be transformed); (2) transformation phase (i.e. creating the derived data types); and (3) feedback phase (i.e. looping back the derived data types to be re-elaborated in recursive loops).

During the filter phase, the filter engine 232 distinguishes among various events and data types produced by publishers 102 and routing the events and data types accordingly. If no subscriber 106 is currently requesting data based on a transformation of a particular event, then the filter engine 232 routes that event only to the message broker 154 and not to the transformation engine 234. If a subscriber 106 requests data based on a transformation of a particular event, then the filter engine 232 routes that event to both the message broker 154 and to the transformation engine 234. If the requested data involves a new data type or event that has not yet been encountered, then the filter engine 232 updates the set of filtering policies and rules synchronously with updating the transformation policies and rules in accordance with the new data type or event. This process allows the transformation engine 234 to properly process data transformations without specifically being aware of updates in transformation rules and policies.

For example, events Ex and Ey received from one or more publishers 102 could be associated with a filtering rule Fc and a transformation rule Rc. Each time that instances of events Ex and Ey are received from associated publishers, the filter engine 232 could route the instances of events Ex and Ey to both the message broker 154 and to the transformation engine 234 according to the filtering rule Fc. The transformation engine 234 would then transform the instances of events Ex and Ey according to the transformation rule Rc.

In some embodiments, the creation of a newly derived data type during the filter phase proceeds according to the pseudocode illustrated in Table 1 below:

TABLE 1

| 10 | # Retrieve a set of field descriptors |
| 20 | metadata = {field_descriptors} |
| 30 | # Look up the predecessor |
| 40 | predecessor = Tree.findPredecessor(metadata) |
| 50 | IF NOT predecessor: |
| 60 | # no predecessor |
| 70 | Tree.createRootedDerivative(metadata) |
| 80 | ELSE: |
| 90 | # nesting the derivative type |
| 100 | Tree.createDerivative(predecessor, metadata) |

As shown in Table 1, the creation of a newly derived data type begins at lines 10-20, where a set of field descriptors for a requested data type is retrieved and assigned to a variable called "metadata." At lines 30-40, the current database and augmentation/derivation tree are scanned to determine if there is a predecessor data type upon which the requested data type may be derived. At lines 50-70, if no predecessor data type is found, then a rooted derivative data type is created based on the metadata variable. That is, a new augmentation/derivation tree is formed with the requested data type as the root. At lines 80-100, if a predecessor data type is found, then a derivative data type is created based on the predecessor data type and the metadata variable. That is, the requested data type is added to an existing augmentation/derivation tree that includes the predecessor data type.

During the transformation phase, the transformation engine 234 transforms received events according to one or more transformation rules and policies, as dynamically updated by the filter engine 232. In this manner, the transformation engine 234 changes behavior dynamically as the filter engine 232 adds new transformation rules and policies based on data requested by subscribers 106.

In some embodiments, a transformation rule may specify that multiple instances of one or more events are to be collected, correlated and/or aggregated prior to applying the transformation rule. In such embodiments, an ad-hoc buffer may be established to collect the specified quantity of events of each type. When the specified quantity and type of event instances have been buffered, the transformation engine 234 may transform the buffered events according to the transformation rule. The transformation rules applied by the transformation engine 234 during the transformation phase are customizable and vary according to the transformation rules as updated by the filter engine 232. In sum, the transformation phase includes (1) receiving in events/data types from publishers 102; (2) buffering the received events/data types as needed according to the current transformation rules; (3) correlating the received events/data types as needed according to the current transformation rules; and (4) aggregating and merging the received events/data types to generate derived data as compound data structures.

For example, the filter engine 232 could be configured to receive two events/data types Ex and Ey. A filter rule and corresponding transformation rule could specify that three instances of event Ex and two instances of event Ey are needed for a particular transformation. At a particular point in time, the filter engine 232 could receive and buffer three instances of event Ex and one instance of event Ey. The transformation engine 234 would then wait until the filter engine 232 receives and buffers a second instance of event Ey. The receipt of the second instance of event Ey would trigger the transformation engine 234 to perform the transformation according to the transformation rule and transmit the resulting derived data back to the filter engine 234.

In some embodiments, the computation of derived data types during the transformation phase proceeds according to the pseudocode illustrated in Table 2 below:

TABLE 2

| 10 | # Retrieve the inverse stack of derivative types |
| 20 | # (from leaf to root) |
| 30 | subtrees=Tree.getSub Trees( ) |
| 40 | WHILE subtrees: |
| 50 |   # extract the subtree |
| 60 |   subtree=subtrees.pop( ) |
| 70 |   data_types=Tree.getDerivatives(subtree) |
| 80 |   # compute partial and derived data types |
| 90 |   derived=None |
| 100 |   WHILE data_types: |
| 110 |     # extract the data types for the current subtree |
| 120 |     data_type=data_types.pop ( ) |
| 130 |     # compute the partial data type |
| 140 |     partial=Transformer.process(data_type) |
| 150 |     # propagate the partial data type version |
| 160 |     Transformer.emitPartial(partial) |
| 170 |     IF data_type.derive( ): |

TABLE 2-continued

| 180 |       # compute the derived data type version |
| 190 |       derived=Transformer.derive(partial, derived) |
| 200 |       # propagate the derived version |
| 210 |       Transformer.emitDerived(derived) |

As shown in Table 2, the computation of a set of transformations begins at lines 10-30, where the set of subtrees that includes the current set of derivative data types is retrieved. The set of subtrees is represented by an inverse stack, where each subtree is evaluated as a reference to the subtree is popped off the inverse stack. As indicated at line 40, lines 50-210 are executed for each subtree represented in the subtree inverse stack. At lines 50-60, the next subtree to be evaluated is retrieved by popping the reference to the subtree off the subtree inverse stack. At line 70, the set of derived data types for the current subtree is retrieved. The set of derived data types is represented by an inverse stack, where each derived data type is evaluated as a reference to the derived data type is popped off the inverse stack.

As indicated at line 80, lines 90-210 are executed to compute partial and derived data types. A derived data type is a data type that is computed from two or more data types and/or attributes and represents a final data type associated with a subscription request. A partial data type is computed from one or more data types and/or attributes and is a component that is used to compute one or more derived data types.

At line 90, a variable called "derived" is initialized to none. As indicated at line 100, lines 110-210 are executed for each derived data type represented in the data type inverse stack. At lines 110-120, the next derived data type to be evaluated is retrieved by popping the reference to the derived data type off the data type inverse stack. At lines 130-140, the transform engine 234 computes the partial derived data type. At lines 150-160, the transform engine 234 propagates the partial derived data type by transmitting the partial derived data type to the filter engine 232.

As indicated at line 170, lines 180-210 are executed if the current derived data type represents a derived data type. At lines 180-190, the transform engine 234 computes the derived data type. At lines 200-210, the transform engine 234 propagates the derived data type by transmitting the partial derived data type to the filter engine 232.

During the feedback phase, the transformation engine 234 reinserts the newly derived data into the main processing loop by transmitting the newly derived data to the filter engine 232. The filter engine 232, in turn, notifies subscribers 106 requesting the newly derived data that this data is now available. The newly derived data may then be deployed as an input to subsequent derived data.

In one example, certain subscribers 106 could submit a subscription request for a data type Y, where Y is a derived data type Y that could be computable from two partial data types X and Z. Partial data type X could be composed of three attributes A, B, and C published by associated publishers 102, denoted as X.A, X.B, and X.C. Partial data type Z could be composed of one attribute D published by an associated publisher 102, denoted as Z.D. Attributes X.A, X.B, X.C, and Z.D are referred to herein as partial attributes or basic units. Derived data type Y could be computed from a subset of these attributes, such as C and D, denoted as Y.X.C and Y.Z.D.

The transformation engine 234 could compute partial data type X from partial attributes X.A, X.B, and X.C and then transmit or emit the partial data type X to the filter engine 232. The transformation engine 234 could likewise compute partial data type Z from partial attribute Z.D and then transmit or emit the partial data type Z to the filter engine 232. The transformation engine 234 could subsequently compute derived data type Y partial attributes Y.X.C and Y.Z.D and then transmit or emit the derived data type Y to the filter engine 232. The filter engine 232 would, in turn, transmit the newly derived partial data types and derived data type to the message broker 154 as appropriate. The message broker 154 would then forward the partial and derived data types to the subscribers 106 requesting the particular data types.

In this manner, new data types and sources are created on-demand, as soon as a specific subscription request is registered for a new data types or source that is currently non-existent but derivable from other existing data types and sources. The data transformation and derivation system 150 recognizes that a newly requested data type or source is derivable from existing data types and sources via one or more transformations by examining existing metadata regarding currently available data types and sources.

Because the three phases described above operate asynchronously with respect to one another, data sources and derived events/data types evolve as needed to fulfill various requests from subscribers 106. Requests for new events/data types result in new filter rules and transformation rules for the filter engine 232 and transformation engine 234, respectively.

As shown in FIG. 2, a subscriber 106 requests a first event consisting of a raw data type produced by a publisher 102. The filter engine 232 receives the first event via path 250(2). The filter engine 232 transmits the first event to the message broker via path 250(1). The message broker 154 then transmits the first event to the requesting subscriber 106 via path 250(0).

Subsequent to the first event request, either the same subscriber 106 or a different subscriber 106 requests a second event, where the second event can be derived from the first event. The filter engine 232 adds a filter rule to cause the first event to be routed to the transformation engine via path 250(3). The filter engine 232 also adds a transformation rule to cause the transformation engine to derive the second event from the first event. The transformation engine 234 derives the second event and transmits the second event to the filter engine 232 via path 252(4). The filter engine 232 transmits the second event to the message broker via path 252(1). The message broker 154 then transmits the second event to the requesting subscriber 106 via path 252(0).

Subsequent to the second event request, either of the previously described subscribers 106 or a different subscriber 106 requests a third event, where the third event can be derived from the second event. The filter engine 232 adds a filter rule to cause the second event to be routed to the transformation engine via path 252(3). The filter engine 232 also adds a transformation rule to cause the transformation engine to derive the third event from the second event. The transformation engine 234 derives the third event and transmits the third event to the filter engine 232 via path 254(4). The filter engine 232 transmits the third event to the message broker via path 254(1). The message broker 154 then transmits the third event to the requesting subscriber 106 via path 254(0).

Figure 3A:
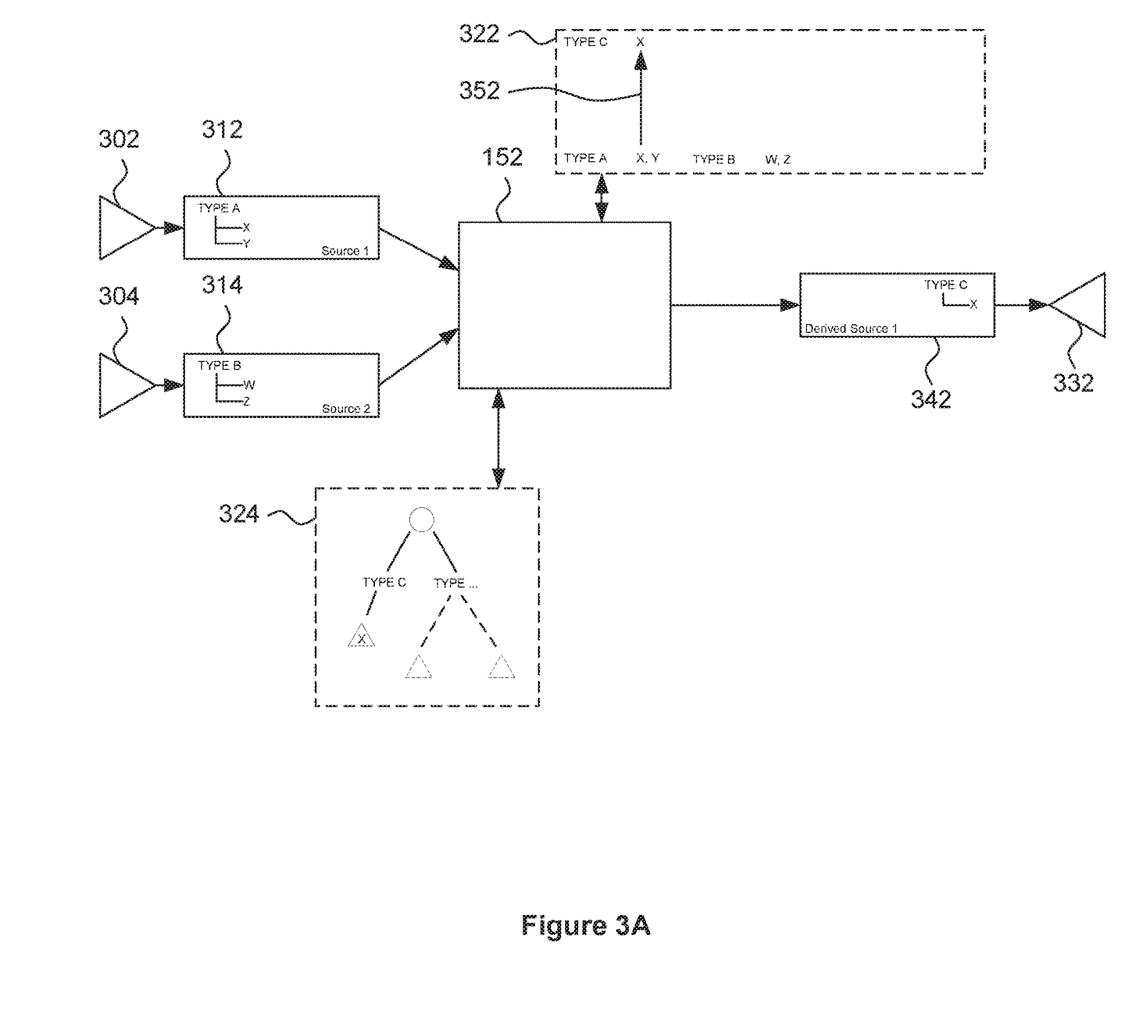
FIGS. 3A-3C illustrate a data flow through the data transformation engine of FIG. 2, according to various embodiments of the present invention.
Figure 3B:
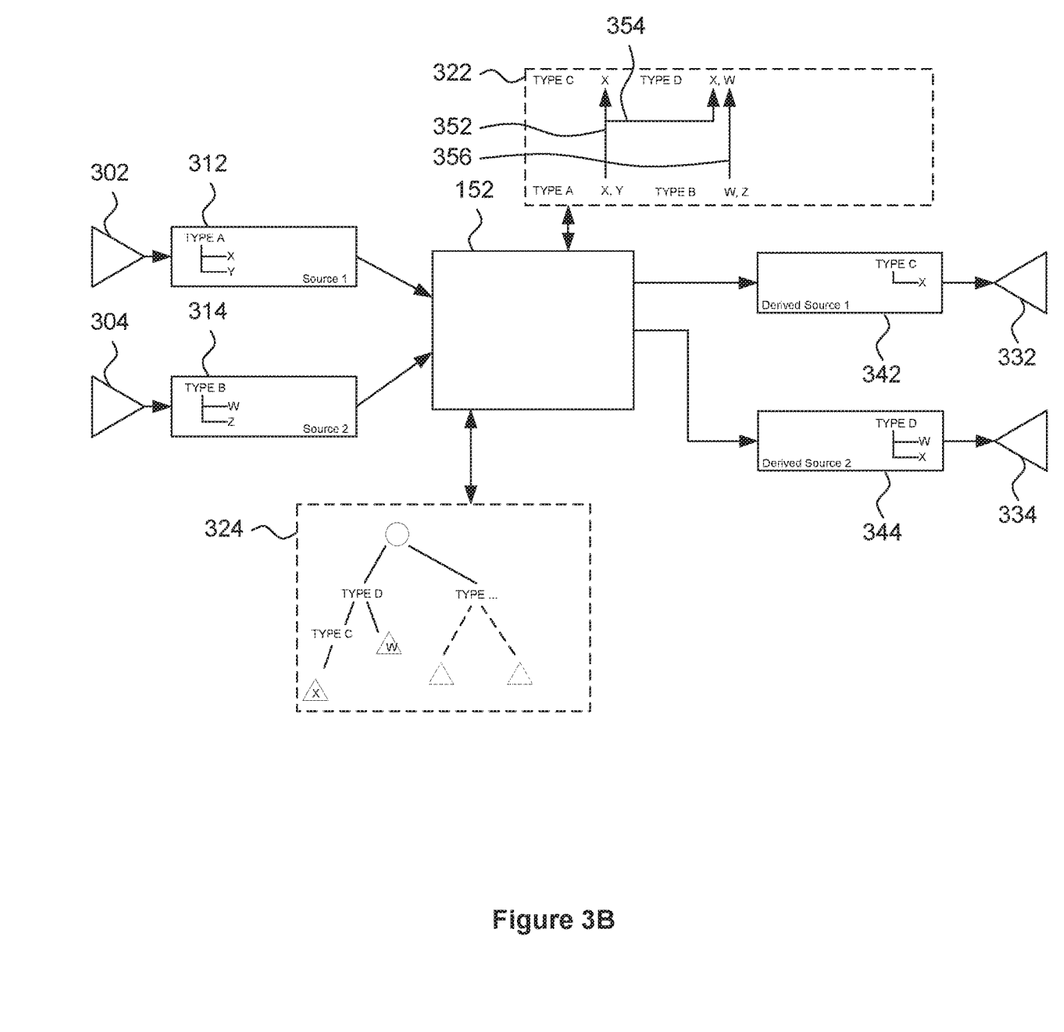
Figure 3C:
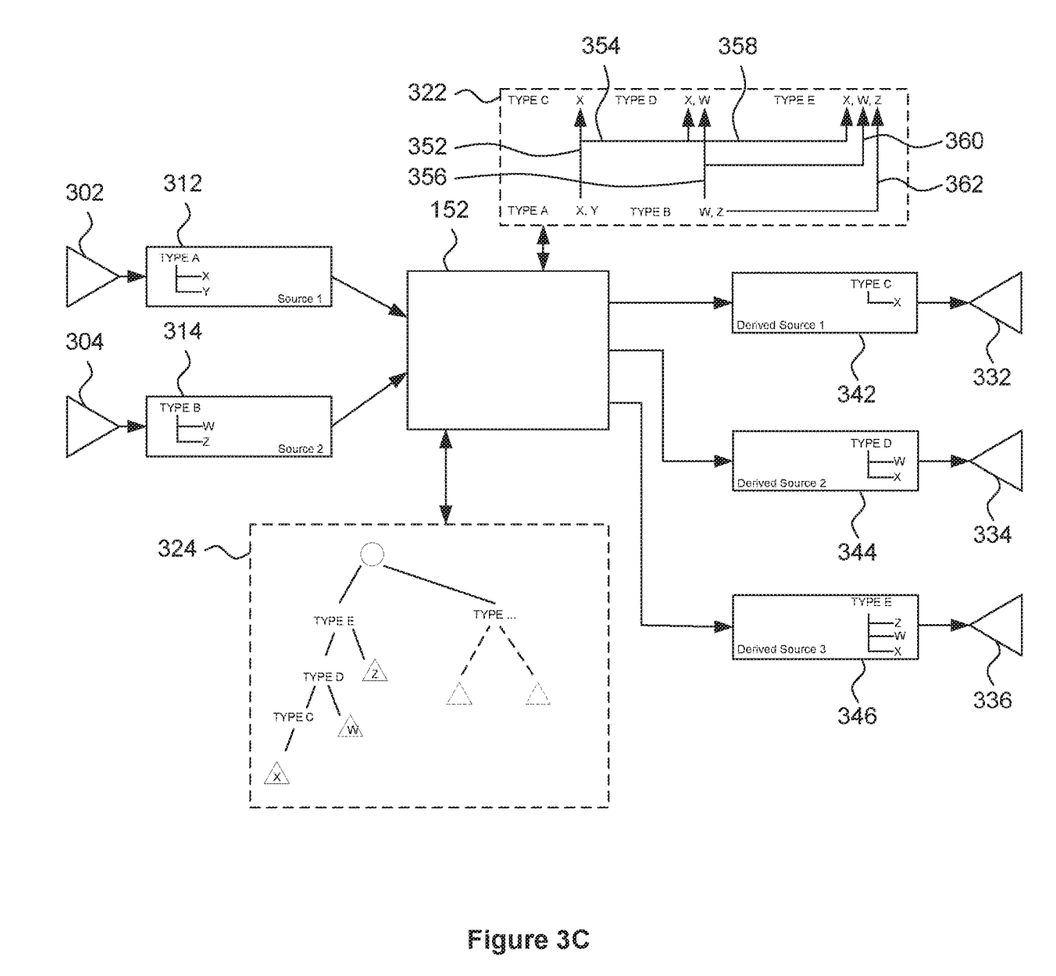

FIGS. 3A-3C illustrate a data flow through the data transformation engine 152 of FIG. 2, according to various embodiments of the present invention. For purposes of clarity only, the message broker 154 is not explicitly illustrated in FIGS. 3A-3C.

As shown in FIG. 3A, the data transformation engine 152 receives raw data of data type A from data source 1 312 via publisher 302. The raw data received from data source 1 312 includes data X and data Y. The data transformation engine 152 further receives raw data of data type B from data source 2 314 via publisher 304. The raw data received from data source 2 314 includes data W and data Z. The data transformation engine 152 updates database 322 to reflect that data X and data Y are of data type A and that data W and data Z are of data type B.

Subscriber 332 then requests data type C, which can be derived from data X. The data transformation engine 152 creates derived source 1 342 by applying a transformation rule to data X. The data transformation engine 152 updates database 322 to reflect that derived data type C is based on data X. More specifically, the data transformation engine 152 updates database 322 with link 352 to indicate that data X of data type A is a predecessor of data X of data type C. The data transformation engine 152 also updates derivation/transformation tree 324 to reflect that derived data type C is derived from data X.

As shown in FIG. 3B, subscriber 334 then requests data type D, which can be derived from data W and derived data type C. The data transformation engine 152 creates derived source 2 344 by applying a transformation rule to data W and derived data type C. The data transformation engine 152 updates database 322 to reflect that data type D is based on data X and data W. More specifically, the data transformation engine 152 updates database 322 with link 354 to indicate that data X of data type A is a predecessor of data X of data type D. The data transformation engine 152 likewise updates database 322 with link 356 to indicate that data W of data type B is a predecessor of data W of data type D. The data transformation engine 152 also updates derivation/transformation tree 324 to reflect that data type D is derived from data W and derived data type C.

As shown in FIG. 3C, subscriber 336 then requests data type E, which can be derived from data Z and derived data type D. The data transformation engine 152 creates derived source 3 346 by applying a transformation rule to data Z and derived data type D. The data transformation engine 152 updates database 322 to reflect that data type E is based on data X, data W, and data Z. More specifically, the data transformation engine 152 updates database 322 with link 358 to indicate that data X of data type A is a predecessor of data X of data type E. The data transformation engine 152 likewise updates database 322 with link 360 to indicate that data W of data type B is a predecessor of data W of data type E. The data transformation engine 152 likewise updates database 322 with link 362 to indicate that data Z of data type B is a predecessor of data Z of data type E. The data transformation engine 152 also updates derivation/transformation tree 324 to reflect that data type E is derived from data Z and derived data type D.

Figure 4A:
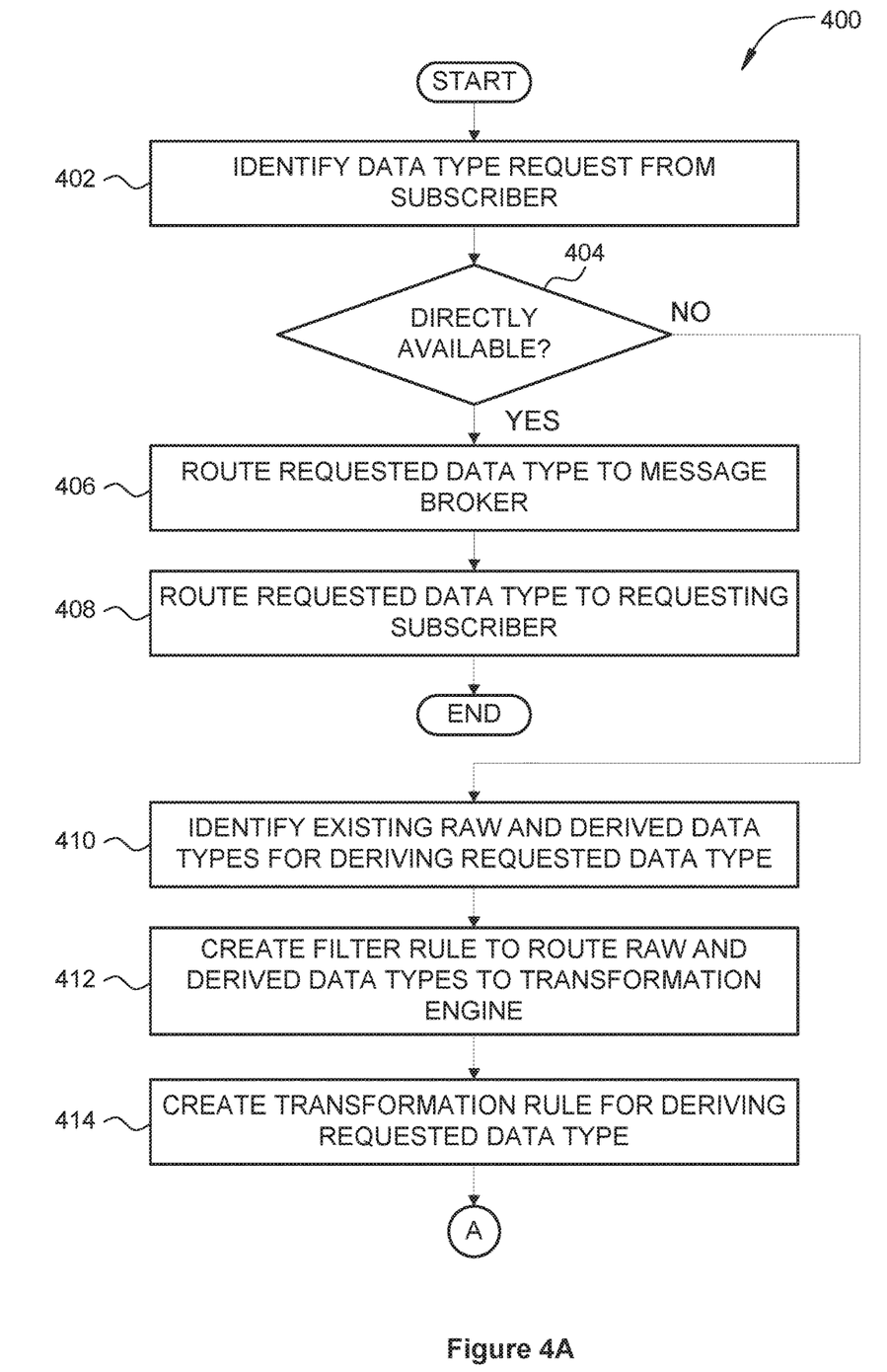
FIGS. 4A-4B set forth a flow diagram of method steps for transforming and distributing data in a distributed computing system, according to various embodiments of the present invention.
Figure 4B:
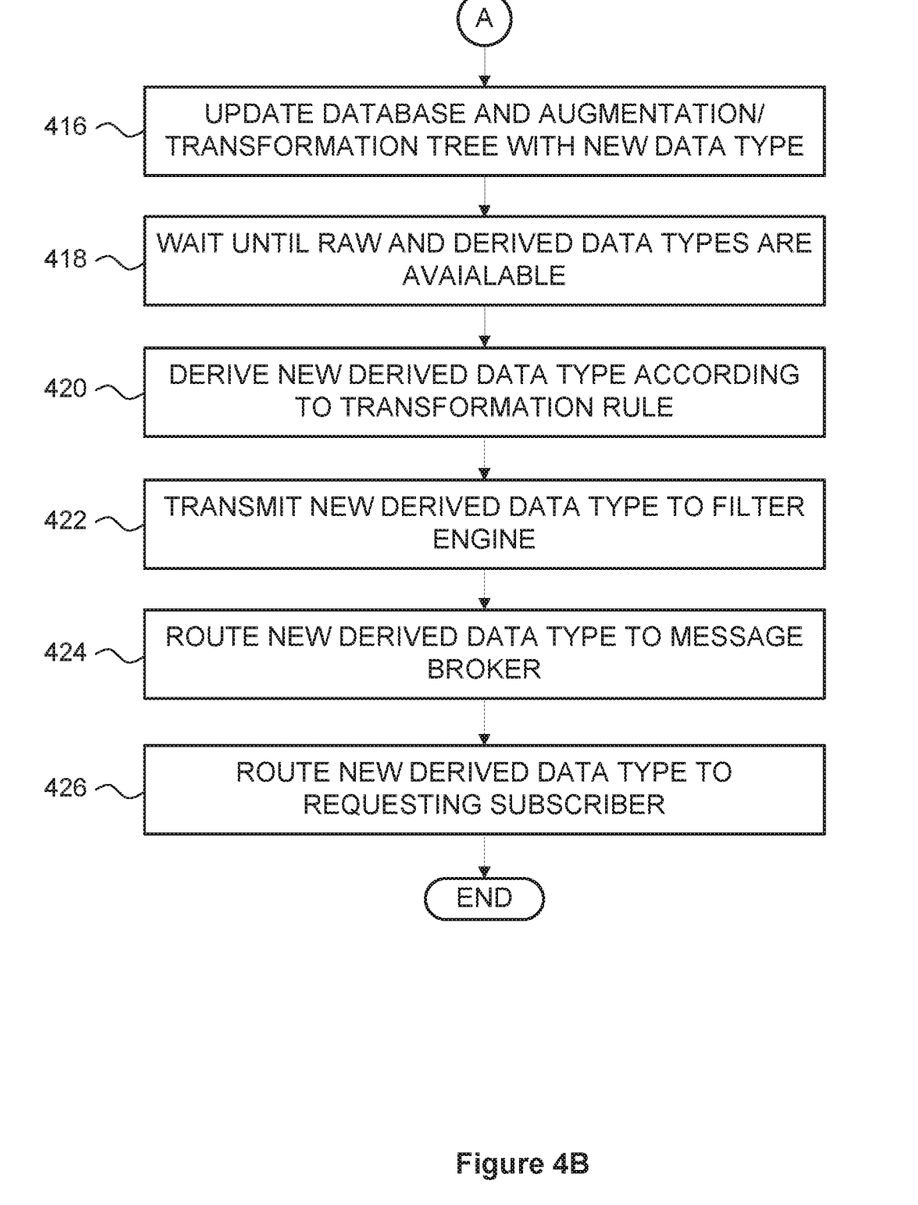

FIGS. 4A-4B set forth flow diagram of method steps for transforming and distributing data in a distributed computing system, according to various embodiments of the present invention. Although the method steps are described in conjunction with the systems of FIGS. 1-3C, persons of ordinary skill in the art will understand that any system configured to perform the method steps, in any order, is within the scope of the present invention.

As shown, a method 400 begins at step 402, where the filter engine 232 included in the data transformation engine identifies a request for a data type from a subscriber 106. At step 404, the filter engine 232 determines whether the requested data type is directly available from a publisher 102 or via an existing transformation rule. If the requested data type is directly available from a publisher 102 or from an existing transformation rule, then the method 400 proceeds to step 406, where the filter engine 232 routes the requested data type to a message broker 154. At step 408, the message broker 154 routes the requested data type to the requesting subscriber 106. The method 400 then terminates.

If, however, at step 404, the requested data type is not directly available from a publisher 102 or existing transformation rule, then the method proceeds to step 410, where the filter engine 232 identifies one or more existing data types from which the requested data type may be derived. The existing data types may be raw data types available from one or more publishers, derived data types created by the transformation engine 234 according to one or more existing transformation rules, or both raw data types and derived data types. At step 412, the filter engine 232 creates a filter rule that causes the identified raw data types and derived data types to be routed to the transformation engine 234. In cases where a particular raw data type or derived data type is also directly requested by a subscriber 106, the filter rule specifies that the particular raw data type or derived data type is routed to both the transformation engine 234 and to a message broker 154. In cases where a particular raw data type or derived data type is not directly requested by a subscriber 106, the filter rule specifies that the particular raw data type or derived data type is routed only to the transformation engine 234.

At step 414, the filter engine 232 creates a transformation rule that causes the transformation engine 234 to derive the newly requested data type by transforming the identified raw data types and existing derived data types. The transformation rule may include any transformation of the identified raw data types and existing derived data types, including, without limitation, changing a data format, filtering the data, aggregating the data, averaging the data, or applying a formula to the data. At step 416, the filter engine 232 updates a database and an augmentation/transformation table to include the newly created derived data type. In so doing, the filter engine 232 updates the database and the augmentation/transformation table to reflect the relationship between the newly created derived data type and the identified raw data types and existing derived data types. The filter engine 232 also updates the database and the augmentation/transformation table to include the associated filter rule and transformation rule.

At step 418, the transformation engine 234 waits until the raw data types and existing derived data types specified by the new transformation rule are received. At step 420, the transformation engine 234 derives the new derived data type by applying the transformation rule to the raw data types and existing derived data types specified by the new transformation rule. At step 422, the transformation engine 234 transmits the new derived data type to the filter engine 232. At step 424, the filter engine 232 routes the newly derived data type to the message broker 154. At step 426, the message broker 154 routes the newly derived data type to the requesting subscriber 106. The method 400 then terminates.

In sum, a data transformation engine recursively tracks data items in a distributed computing environment. Upon receiving a request from a client device for a particular data item, the data transformation engine finds one or more relevant data sources for the requested data item. The data sources may include raw data directly from a data source, derived data, or a combination of raw data and derived data. If needed, the data transformation engine performs a data transformation on the relevant data sources to produce a new derived data source. The data transformation engine makes the new derived data source available to the requesting client device. Finally, the data transformation engine stores information regarding the new derived data source, thereby making the new derived data source available to other client devices on the network.

At least one advantage of the disclosed techniques is that derived data is made available to client devices with reduced latency relative to prior approaches. As a result, data is consumed by client devices in real time or near real time as the raw data is produced by the data source. Another advantage of the disclosed techniques is that new data types are automatically and recursively created from either raw data sources, derived data, or a combination of raw data sources and derived data. As a result, requests for new forms of derived data can leverage existing derived data sources, reducing the calculations needed to create new derived data sources. New data types and sources are created on-demand, as soon as a specific subscription request is registered for a new data types or source that is currently non-existent but derivable from other existing data types and sources. The data transformation and derivation system 150 recognizes that a newly requested data type or source is derivable from existing data types and sources via one or more transformations by examining existing metadata regarding currently available data types and sources.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for transforming and distributing data in a distributed computing system, comprising:
   identifying a first subscription request received from a first subscriber for a first resource included in a plurality of resources;
   determining that the first resource is not available from any publisher included in a plurality of publishers;
   in response to determining that the first resource is not available from any publisher, generating, via a processor, a first transformation rule that combines at least a second resource available from a first publisher included in the plurality of publishers and a third resource available from a second publisher included in the plurality of publishers, wherein the first resource is derivable from at least the second resource and the third resource;
   buffering the second resource while waiting for the third resource to be received;
   in response to receiving the third resource, combining at least the second resource and the third resource to derive the first resource based on the first transformation rule; and
   publishing the first resource to at least the first subscriber.

2. The computer-implemented method of claim 1, further comprising, in response to determining that the first resource is not available from any publisher, determining that the first resource is derivable based on at least the second resource.

3. The computer-implemented method of claim 1, further comprising:
   identifying a second subscription request received from a second subscriber for a fourth resource included in the plurality of resources;
   determining that the fourth resource is not available from any publisher included in the plurality of publishers;
   generating a second transformation rule that transforms at least the first resource into the fourth resource;
   transforming at least the first resource into the fourth resource based on the second transformation rule; and
   publishing the fourth resource to the first subscriber.

4. The computer-implemented method of claim 1, further comprising:
   determining whether the second resource is associated with a second subscription request received from a second subscriber; and
   if the second resource is not associated with a second subscription request, then generating a filter rule that routes the second resource from the first publisher to a transformation engine; or
   if the second resource is associated with a second subscription request, then generating a filter rule that routes the second resource from the first publisher to both a transformation engine and a first message broker.

5. The computer-implemented method of claim 4, further comprising, if the second resource is not associated with a second subscription request, then:
   determining that the second resource is associated with a third subscription request received from a third subscriber; and
   altering the filter rule to route the second resource from the first publisher to both a transformation engine and a first message broker.

6. The computer-implemented method of claim 1, where the first transformation rule changes at least one of a reporting frequency associated with the second resource and a format associated with the second resource.

7. A non-transitory computer-readable storage medium including instructions that, when executed by a processor, cause the processor to transform and distribute data in a distributed computing system, by performing the steps of:
   identifying a first subscription request received from a first subscriber for a first resource included in a plurality of resources;
   determining that the first resource is not available from any publisher included in a plurality of publishers;
   in response to determining that the first resource is not available from any publisher, generating, via a processor, a first transformation rule that combines at least a second resource available from a first publisher included in the plurality of publishers and a third resource available from a second publisher included in the plurality of publishers, wherein the first resource is derivable from at least the second resource and the third resource;
   buffering the second resource while waiting for the third resource to be received;

in response to receiving the third resource, combining at least the second resource and the third resource to derive the first resource based on the first transformation rule; and publishing the first resource to at least the first subscriber.

8. The non-transitory computer-readable storage medium of claim 7, further comprising transmitting a message to a first message broker associated with the first subscriber that includes the first resource.

9. The non-transitory computer-readable storage medium of claim 7, further comprising:
identifying a second subscription request received from a second subscriber for the second resource; and
transmitting a message to a second message broker associated with the second subscriber that includes the second resource.

10. The non-transitory computer-readable storage medium of claim 7, further comprising:
identifying a second subscription request received from a second subscriber for a fourth resource included in the plurality of resources;
determining that the fourth resource is not available from any publisher included in the plurality of publishers;
generating a second transformation rule that transforms at least the first resource into the fourth resource;
transforming at least the first resource into the fourth resource based on the second transformation rule; and
publishing the fourth resource to the first subscriber.

11. The non-transitory computer-readable storage medium of claim 7, further comprising:
determining whether the second resource is associated with a second subscription request received from a second subscriber; and
if the second resource is not associated with a second subscription request, then generating a filter rule that routes the second resource from the first publisher to a transformation engine; or
if the second resource is associated with a second subscription request, then generating a filter rule that routes the second resource from the first publisher to both a transformation engine and a first message broker.

12. The non-transitory computer-readable storage medium of claim 11, further comprising, if the second resource is not associated with a second subscription request, then:
determining that the second resource is associated with a third subscription request received from a third subscriber; and
altering the filter rule to route the second resource from the first publisher to both a transformation engine and a first message broker.

13. The non-transitory computer-readable storage medium of claim 7, further comprising:
identifying a second subscription request received from a second subscriber for a fourth resource included in the plurality of resources;
determining that the fourth resource is not available from any publisher included in the plurality of publishers;
generating a second transformation rule that transforms the first resource and a fifth resource included in the plurality of resources into the fourth resource;
transforming the first resource and the fifth resource into the fourth resource based on the second transformation rule; and
publishing the fourth resource to the first subscriber.

14. The non-transitory computer-readable storage medium of claim 13, wherein the fifth resource is available from a third publisher included in the plurality of publishers.

15. The non-transitory computer-readable storage medium of claim 13, wherein the fifth resource has been transformed from a sixth resource included in the plurality of resources based on a third transformation rule.

16. The non-transitory computer-readable storage medium of claim 7, where the first transformation rule changes at least one of a reporting frequency associated with the second resource and a format associated with the second resource.

17. A computing device, comprising:
a memory that includes a data transformation engine; and
a processor that is coupled to the memory and, when executing the data transformation engine, is configured to:
identify a first subscription request received from a first subscriber for a first resource included in a plurality of resources;
determine that the first resource is not available from any publisher included in a plurality of publishers;
in response to determining that the first resource is not available from any publisher, generate, via a processor, a first transformation rule that combines at least a second resource available from a first publisher included in the plurality of publishers and a third resource available from a second publisher included in the plurality of publishers, wherein the first resource is derivable from at least the second resource and the third resource;
buffer the second resource while waiting for the third resource to be received;
in response to receiving the third resource, combine at least the second resource and the third resource to derive the first resource based on the first transformation rule; and
publish the first resource to at least the first subscriber.

18. The computing device of claim 17, wherein, when executing, the data transformation engine is further configured to transmit a message to a first message broker associated with the first subscriber that includes the first resource.

19. The computing device of claim 17, wherein, when executing, the data transformation engine is further configured to:
identify a second subscription request received from a second subscriber for a fourth resource included in the plurality of resources;
generate a second transformation rule that transforms at least two instances of a fifth resource included in the plurality of resources into the fourth resource;
transform the at least two instances of the fifth resource into the fourth resource based on the second transformation rule; and
publish the first resource to at least the second subscriber.

* * * * *